May 9, 1967  W. I. LINLOR  3,318,512
METHOD FOR DEGASSING A VACUUM SYSTEM
Filed March 18, 1966
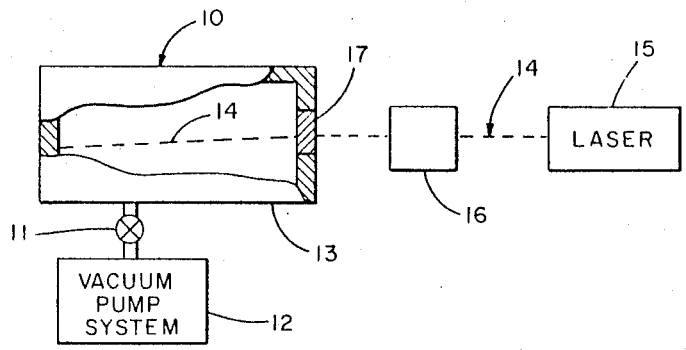
INVENTOR.
WILLIAM I. LINLOR
BY 3,318,512
METHOD FOR DEGASSING A VACUUM SYSTEM
William I. Linlor, Mountain View, Calif., assignor to the United States of America as represented by the United States Atomic Energy Commission
Filed Mar. 18, 1966, Ser. No. 536,948
4 Claims. (Cl. 230—69)

The invention described herein was made in the course of, or under, a contract with the U.S. Atomic Energy Commission.

This invention relates to a method for degassing a vacuum system in the production of ultra-high vacuums. In particular, this invention relates to a method for degassing the inner surfaces of a vacuum system utilizing a pulsed laser light beam.

In the production of ultra-high vacuums, below $10^{-6}$ to $10^{-8}$ Torr, the vacuum vessel is generally evacuated by conventional vacuum pumping means such as a combination of mechanical pumps, diffusion pumps and cryogenic cold traps. For further reduction in pressure, a getter material is commonly evaporated onto a surface within the vacuum vessel. The getter during volatilization and after evaporation adsorbs residual gases from the vessel. Such materials, after the initial adsorption of gases, do not continue to remove gases from the system but reach an adsorption-desorption equilibrium unless further getter material is introduced.

In both glass and metal systems, the materials in the vacuum region may randomly release adsorbed and absorbed gases and vapors back into the vacuum vessel. This phenomenon, known as outgassing, is most prevalent in new vacuum systems, in systems that have been let down to atmospheric pressure or when new materials are installed in the vacuum system. When a system is put on pumps, a good deal of effort can be expended in leak hunting when actually the difficulty lies in degassing various surfaces in the vacuum system.

In order to minimize this phenomenon, metals and glass are conventionally heated in a vacuum or in hydrogen, depending upon the material, to temperatures ranging from 300° C. to 1800° C. in a bake-out oven or by induction heating of the entire vacuum vessel. Such degassing procedures require extended intervals of time, sometimes as long as 36 hours, and involve expensive equipment and risk of damage to temperature-sensitive components within the bake-out region. As the system is heated, the conventional pumps continue to operate, thus evacuating the gas desorbed from the heated surfaces.

In thermonuclear and plasma research, it has been discovered that a certain amount of the gas adsorbed in the vacuum vessel surface is desorbed by photons produced by the plasma. These gases, as is well known in the art, contaminate the plasma providing a further limiting factor to the plasma which can be obtained.

It is an object of this invention to provide a method for degassing vacuum systems in the production of ultra-high vacuums without prolonged heating of the system.

Various other objects and advantages will appear in the following description of the invention, and the most novel features will be particularly pointed out hereinafter in connection with the appended claims.

This invention relates to a method for degassing a vacuum system in which an ultra-high vacuum is to be produced. A laser beam is generated and focused on the inner surfaces of the vacuum system from which the impurities are to be desorbed and the beam is scanned over the surfaces at a rate sufficient to desorb the impurities while pumping the desorbed impurities from the system.

The present invention is illustrated in the accompanying partially cut-away schematic view of one embodiment of this invention.

As illustrated in the drawing, the enclosed vacuum system 10, which includes a vacuum vessel 13, is coupled by valve 11 to a conventional high vacuum pump system 12. Valve 11 and vacuum pump system 12 can be a conventional apparatus such as illustrated in FIG. 2.1 on page 61 of "Vacuum Equipment and Techniques," edited by Guthrie and Wakerling, McGraw-Hill Book Co., Inc., 1949 (National Nuclear Energy Series, Div. I—volume I). The vacuum pump system 12 can include conventional components such as a high vacuum diffusion pump, a booster diffusion pump, a cold trap and a mechanical pump, all connected in series.

A laser light beam 14, generated by a laser 15, is passed through a scanning means 16 and a window 17 in system 10 so as to impinge on an inner surface of system 10. While the surface to be degassed is illustrated as an inner surface of the vacuum vessel for the vacuum system 10, it is clear that any apparatus or element in system 10 can be degassed by this invention. Scanning system 16 can be a conventional scanning system using rotating mirrors, prisms, fiber optics, or optical lenses which can focus the beam and also provide a raster-like scan such as is described in copending application S.N. 307,273 for Light Spot Apparatus to Robert B. Palmer and filed Sept. 6, 1963. Window 17 can be of any high strength light transmitting material such as glass or quartz. Provision can be made for additional windows depending upon the surface or surfaces to be scanned, their position in system 10, or the limitations on the scanning provided by scanning means 16. Laser 15 can be a conventional solid state or gas laser such as the lasers described in the paper titled "High Repetition Rate Pulsed Lasers" by Mallory and Tittel as published in the Proceedings of the Symposium on Optical Masers, vol. XIII, Polytechnic Press, 1963. It is apparent that laser 15 and scanning means 16 can be positioned within system 10 and controlled externally.

In operation, vacuum pump system 12 is operated in a conventional manner until a vacuum of the order of $10^{-6}$ Torr or less is established. With the vacuum pump system 12 operating and maintaining the established vacuum, the laser light beam 14, generated by laser 15, is passed through scanning means 16 and the window 17 so as to impinge on an inner surface of system 10. Scanning means 16 then scans the laser light beam 14 across the surface. In the case of a pulsed laser beam, the scanning means causes the pulsed laser beam to impinge successively on a different portion of the surface for each laser pulse.

In the case of a solid-state laser that delivers its energy in a time of the order of a millisecond, an energy deposition of about 1 joule per sq. cm. is adequate to out-gas the portion of the surface scanned, generally about 1 sq. cm. In a giant-pulse laser (i.e., "Q" switch) that delivers its energy in a time of the order of a microsecond, .1 joule per sq. cm. is adequate. In either case, degassing results from both the heating of the surface of the vessel or apparatus to the gas desorption temperature and the interaction of photons with the adsorbed gas.

As an illustrative case, a vacuum system having a vessel that is a cylinder 20 cm. in diameter and 1 meter long has an internal surface area of about $3 \times 10^4$ sq. cm. At a laser pulse rate of 10 per second, each light pulse covering 1 sq. cm., the laser would require a time of about 1 hour to degas the entire surface.

It will be understood that various changes in the details, materials, steps and arrangement of parts, which have been herein described and illustrated in order to explain the nature of the invention, may be made by those skilled in the art within principles and scope of the invention as expressed in the appended claims.

What is claimed is:

1. A method of degassing a vacuum system including a vacuum vessel, comprising:
   (a) pumping the gaseous components from a vacuum system to form and maintain a vacuum in the system, and
   (b) scanning a lasser beam across successive areas on the inner surfaces of said system whereby impurities are desorbed from the material and removed from the system.

2. The method of claim 1 wherein said laser beam is pulsed.

3. The method of claim 2 wherein said laser beam pulse has a duration in the range of .001 to 1 millisecond with an energy of .1 to 1 joule/cm.$^2$ respectively.

4. The method of claim 1 wherein said laser beam is generated outside of said system and passed into the vessel through a light transmissive window in said vessel.

References Cited by the Examiner
UNITED STATES PATENTS 2,182,751  12/1939  Reitherman _____ 230—69
2,527,747  10/1950  Lewis et al.

ROBERT M. WALKER, *Primary Examiner*.